United States Patent
Kochiev et al.

(10) Patent No.: US 12,512,925 B2
(45) Date of Patent: Dec. 30, 2025

(54) SYSTEMS AND METHODS FOR DYNAMIC SCHEDULING OF MULTIPLEXING IN A WIRELESS NETWORK

(71) Applicant: T-MOBILE INNOVATIONS LLC, Overland Park, KS (US)

(72) Inventors: Timur Kochiev, Irvine, CA (US); Mochamad Mirza, Bothell, WA (US); Relin Thomas, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 469 days.

(21) Appl. No.: 18/128,072

(22) Filed: Mar. 29, 2023

(65) Prior Publication Data
US 2024/0333416 A1    Oct. 3, 2024

(51) Int. Cl.
| | | |
|---|---|---|
| H04L 1/00 | (2006.01) | |
| H04W 52/24 | (2009.01) | |
| H04W 72/54 | (2023.01) | |

(52) U.S. Cl.
CPC ......... *H04L 1/0003* (2013.01); *H04W 52/241* (2013.01); *H04W 72/54* (2023.01)

(58) Field of Classification Search
CPC .... H04L 1/0003; H04W 52/241; H04W 72/54
See application file for complete search history.

(56) References Cited

U.S. PATENT DOCUMENTS

| | | | | |
|---|---|---|---|---|
| 2019/0140729 A1* | 5/2019 | Zhang | ................... | H04B 7/0478 |
| 2023/0269670 A1* | 8/2023 | Shah | ................... | H04W 52/241 |
| | | | | 455/522 |
| 2024/0333416 A1* | 10/2024 | Kochiev | ............... | H04W 72/54 |

FOREIGN PATENT DOCUMENTS

EP    3135013 B1 *    8/2019    ........... H04L 5/0023

OTHER PUBLICATIONS

"PDSCH DMRS (DeModulation Reference Signal) in a Nutshell", https://www.sharetechnote.com/html/5G/5G_PDSCH_DMRS.html, Downloaded May 5, 2023, 20 Pages.
"Demodulation reference signals for PDSCH", https://www.nrexplained.com/dmrs_pdsch, Downloaded May 5, 2023, 6 Pages.
"5G NR Downlink CSI Reporting", https://www.mathworks.com/help/5g/ug/5g-nr-downlink-csi-reporting.html, Downloaded May 5, 2023, 21 Pages.

* cited by examiner

*Primary Examiner* — Afshawn M Towfighi
(74) *Attorney, Agent, or Firm* — SHOOK, HARDY & BACON L.L.P.; Elena K. McFarland

(57) ABSTRACT

Aspects herein provide systems, methods, and media for dynamically scheduling multiplexing in a wireless network. In aspects, a base station determines whether to utilize multiplexing without power boosting or to utilize power boosting without multiplexing when scheduling and communicating a reference signal over a downlink channel for a user device. These autonomous determinations of the base station are based on an evaluation of signal metrics of a user device and/or base station characteristics relative to one or more customized thresholds.

20 Claims, 5 Drawing Sheets

SYSTEMS AND METHODS FOR DYNAMIC SCHEDULING OF MULTIPLEXING IN A WIRELESS NETWORK

TECHNICAL BACKGROUND

The present disclosure generally relates to multiplexing in telecommunications networks.

SUMMARY

A high-level overview of various aspects of the invention are provided here for the purpose of providing an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

In one aspect, a computerized method is provided. The computerized method includes receiving a signal that encodes one or more metrics from the user device and determining an estimated signal value of the user device based on the one or more metrics in the signal received. The method identifies a threshold that is specific to a base station or the one or more metrics of the user device, and compares the estimated signal value of the user device to the threshold identified. When the estimated signal value is at or above the threshold, a base station communicates with the user device by using multiplexing without power boosting. When the estimated signal value is below the threshold, a base station communicates with the user device by using power boosting without multiplexing.

In another aspect, one or more non-transitory computer-readable media storing instructions that when executed via one or more processors perform a computerized method via one or more processors. The method can be performed through the media for each of a plurality of user devices associated with a base station. Generally, a signal is received that encodes one or more metrics from a user device. An estimated signal value of the user device is then determined based on the one or more metrics in the signal received. A threshold that is specific to a base station or the one or more metrics of the user device is identified. The estimated signal value of the user device is compared to the threshold identified. When the estimated signal value is at or above the threshold, a base station communicates with the user device by using multiplexing without power boosting. When the estimated signal value is below the threshold, a base station communicates with the user device by using power boosting without multiplexing.

In yet another aspect, a system is provided. The system includes one or more processors communicatively coupled to a base station. The one or more processors are configured to receive a signal that encodes one or more metrics from a user device and determine an estimated signal value of the user device based on the one or more metrics in the signal received. The one or more processors further identify a threshold that is specific to a base station or the one or more metrics of the user device and compare the estimated signal value of the user device to the threshold identified. When the estimated signal value is at or above the threshold, the base station communicates with the user device using multiplexing without power boosting. When the estimated signal value is below the threshold, the base station communicates with the user device using power boosting without multiplexing.

BRIEF DESCRIPTION OF THE DRAWINGS

Aspects are described in detail below with reference to the attached drawings figures, wherein.

DETAILED DESCRIPTION

Figure 1:
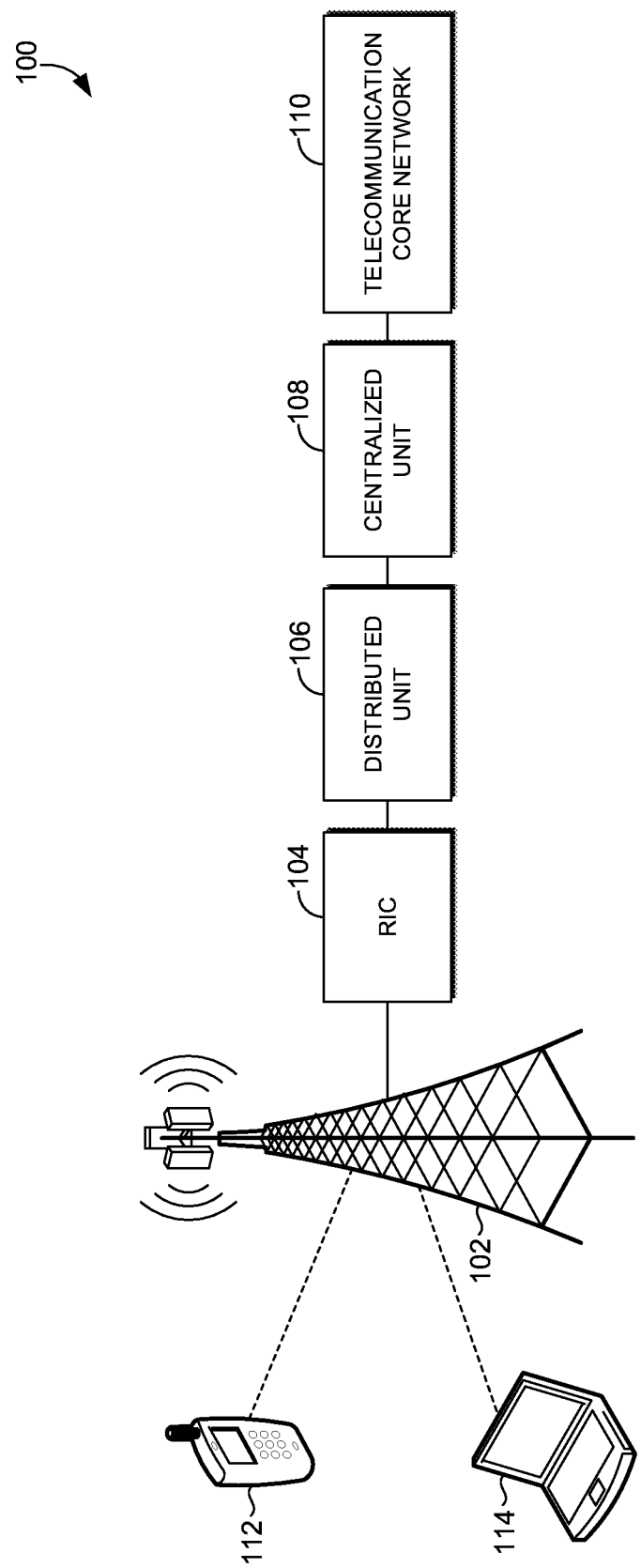
FIG. 1 depicts an example of a system in accordance with one or more aspects.

The subject matter of the present invention is being described with specificity herein to meet statutory requirements. However, the description itself is not intended to limit the scope of this patent. Rather, the inventors have contemplated that the claimed subject matter might also be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described. As such, although the terms "step" and/or "block" may be used herein to connote different elements of system and/or methods, the terms should not be interpreted as implying any particular order and/or dependencies among or between various components and/or steps herein disclosed unless and except when the order of individual steps is explicitly described. The present disclosure will now be described more fully herein with reference to the accompanying drawings, which may not be drawn to scale and which are not to be construed as limiting. Indeed, the present invention can be embodied in many different forms and should not be construed as limited to the aspects set forth herein.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

3G Third-Generation Wireless Access Technology
4G Fourth-Generation Wireless Access Technology
5G/5G NR Fifth-Generation Wireless Access Technology/New Radio
5GC Fifth-Generation Wireless Access Technology Core Network
AAU Active Antenna Unit
BRS Broadband Radio Service
CD-ROM Compact Disk Read Only Memory CDMA Code Division Multiple Access
CU Central unit
DU Distribution unit
EIRP Equivalent Isotropically Radiated Power
eNodeB Evolved Node B
EVDO Evolution-Data Optimized
GIS Geographic/Geographical/Geospatial Information System
gNodeB/gNB Next Generation Node B
gNB CU Next Generation Node B Central Unit
gNB DU Next Generation Node B Distribution Unit
GPRS General Packet Radio Service
GSM Global System for Mobile Communications
iDEN Integrated Digital Enhanced Network
DVD Digital Versatile Disc
EEPROM Electrically Erasable Programmable Read-Only Memory
FD-MIMO Full Dimension Multiple-Input Multiple-Output
IOT Internet of Things
IIOT Industry Internet of Things
LED Light Emitting Diode
LTE Long Term Evolution
MEC Mobile Edge Computer
MD Mobile Device
MIMO Multiple-Input Multiple-Output
mMIMO Massive Multiple-Input Multiple-Output
MMU Massive Multiple-Input Multiple-Output Unit
mmWave Millimeter Wave
NEXRAD Next-Generation Radar
NR New Radio
OOBE Out-of-Band-Emission
OTN Optical Transport Network
PC Personal Computer
PCS Personal Communications Service
PDA Personal Digital Assistant
PLMN Public Land Mobile Network
PRB Physical Resource Block
vPRB Virtualized Physical Resource Block
RAN Radio Access Network
RAM Random Access Memory
RET Remote Electrical Tilt
RF Radio-Frequency
RFI Radio-Frequency Interference
RIC Radio Intelligent Controller
RLF Radio Link Failure
R/N Relay Node
RNR Reverse Noise Rise
ROM Read-Only Memory
RRU Remote Radio Unit
RSRP Reference Signal Receive Power
RSRQ Reference Signal Receive Quality
RSSI Received Signal Strength Indicator
RU Radio Unit
SINR Signal-to-Interference-&-Noise Ratio
SNR Signal-to-Noise Ratio
SON Self-Organizing Networks
TDMA Time Division Multiple Access
TXRU Transceiver (or Transceiver Unit)
UE User Equipment
UMTS Universal Mobile Telecommunications System
UTRAN UMTS Radio Access Network
E-UTRAN Evolved Universal Mobile Telecommunications System
WCD Wireless Communication Device (interchangeable with UE)
WLAN Wireless Local Area Network
XR Extended Reality Further, various technical terms are used throughout this description. An illustrative resource that fleshes out various aspects of these terms can be found in Newton's Telecom Dictionary, 25th Edition (2009).

Aspects herein may be embodied as, among other things: a method, system, or set of instructions embodied on one or more computer-readable media. Aspects may take the form of a hardware embodiment or an embodiment combining software and hardware. Some aspects may take the form of a computer program product that includes computer-useable or computer-executable instructions embodied on one or more computer-readable media.

Definitions

"Computer-readable media" can be any available media and may include volatile and non-volatile media, as well as removable and non-removable media. By way of example, and not limitation, computer-readable media may include computer storage media and communication media. Computer-readable media may include both volatile and non-volatile media, removable and non-removable media, and may contemplate media readable by a database, a switch, and various other network devices. Computer-readable media includes media implemented in any way for storing information. Examples of stored information include computer-useable instructions, data structures, program modules, and other data representations.

"Computer storage media" may include, without limitation, volatile and non-volatile media, as well as removable and non-removable media, implemented in any method or technology for storage of information, such as computer-readable instructions, data structures, program modules, or other data. In this regard, computer storage media may include, but is not limited to, RAM, ROM, Electrically Erasable Programmable Read-Only Memory (EEPROM), flash memory or other memory technology, CD-ROM, DVD, holographic media, or other optical disk storage, magnetic cassettes, magnetic tape, magnetic disk storage or other magnetic storage device, or any other medium that can be used to store the desired information and which may be accessed by the computing device 500 shown in FIG. 5. These technologies can store data momentarily, temporarily, or permanently.

"Communication media" may include, without limitation, computer-readable instructions, data structures, program modules, or other data in a modulated data signal, such as a carrier wave or other transport mechanism, and may include any information-delivery media. As used herein, the term "modulated data signal" refers to a signal that has one or more of its attributes set or changed in such a manner so as to encode information in the signal. By way of example, and not limitation, communication media includes wired media such as a wired network or direct-wired connection, and wireless media such as acoustic, radio frequency (RF), infrared, and other wireless media. Combinations of any of the above may also be included within the scope of computer-readable media.

"Network" refers to a network comprised of wireless and wired components that provide wireless communications service coverage to one or more UE. For example, the network may include one or more, or a plurality of: wireless networks, hardwired networks, telecommunication networks, peer-to-peer networks, distributed networks, and/or any combination thereof. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various aspects. Examples of a network include a telecommunications network (e.g., 3G, 4G, 5G, CDMA, CDMA 1×A, GPRS, EVDO, TDMA, GSM, LTE, and/or LTE Advanced). Additional examples of a network include a wide area network (WAN), a local area network (LAN), a metropolitan area network (MAN), a wide area local network (WLAN), a personal area network (PAN), a campus-wide network (CAN), a storage area network (SAN), a virtual private network (VPN), an enterprise private network (EPN), a home area network (HAN), a Wi-Fi network, a Worldwide Interoperability for Microwave Access (WiMax) network, and/or an ad-hoc (mesh) network. The network may include or may communicate with a physical location component for determining a geographic location of an item, package, parcel, personnel, vehicle, end-point location, etc., by leveraging, for example, a Global Positioning System (GPS), Global'naya Navigatsionnaya Sputnikovaya Sistema (GLONASS), BeiDou Navigation Satellite System (BDS), Global Navigation Satellite System (GNSS or "Galileo"), an indoor position system (IPS), or other positioning systems that leverage non-GPS signals or networks (e.g., signals of opportunity [SOP]).

"Physical resource block" (PRB) and "actual physical resource block" are used interchangeably to refer to a defined quantity of consecutive subcarriers in a frequency domain that are used for wireless transmission and wireless reception of waveform signals via antenna/antenna elements. In some instances, a physical resource block has a defined quantity of consecutive subcarriers in a frequency domain within one slot in a time domain (e.g., LTE). In other instances, a physical resource block has a defined quantity of consecutive subcarriers in a frequency domain independent of the time domain (e.g., 5G NR). In one example, one resource block has twelve consecutive subcarriers of a frequency domain, where one subcarrier corresponds to one resource element in the resource block. The bandwidth of various physical resource blocks is dependent on the numerology and subcarrier spacing utilized, which corresponds to the frequency bands as defined in kilohertz (kHz) and which determines the cyclic prefix of said block in milliseconds (ms). For example, 5G New Radio (NR) technology supports subcarrier spacing of 15, 30, 60, 120, and 240 kHz while LTE technology supports only one subcarrier spacing of 15 kHz. The physical resource blocks form bandwidth parts (BWP). The physical resource blocks discussed herein are compatible and usable in LTE, 3G, 4G, 5G, IoT, IIOT, Narrowband IoT, and similar technologies without limitation. Physical resource blocks are discussed herein in a network-agnostic manner since the aspects discussed herein can be implemented within each of the different technology environments.

"Cell site" is generally used herein to refer to a defined wireless communications coverage area (i.e., a geographic area) serviced by a base station, or a plurality of neighboring base stations working together to provide a single coverage area. Also, it will be understood that one base station may control one cell site, or alternatively, one base station may control multiple cell sites.

"Access point," "gNodeB," and "base station" may refer to hardware, software, devices, or other components forming a base station or cell tower having an antenna, an antenna array, a radio, a transceiver, and/or a controller. As discussed herein, a base station is a device comprised of hardware and complex software that is deployed in a network so that the base station can control and facilitate, via one or more antenna or antenna arrays, the broadcast, transmission, synchronization, and receipt of wireless signals in order to communicate with, verify, authenticate, and provide wireless communications service coverage to one or more user devices that request to join and/or are connected to the network. Generally, a base station communicates directly with one or more user devices according to one or more access technologies (e.g., 3G, 4G, LTE, 5G, mMIMO). Examples of a base station include a NodeB, an eNodeB, a gNodeB, a macro cell, a small cell, a micro cell, a femto-cell, a pico-cell, and/or a computing device capable of acting as a wireless "hotspot" that enables connectivity to the network. Accordingly, the scale and coverage area of a base station is not limited to the examples discussed. Base stations may work alone or in concert with one another, locally or remotely, such that a base station is not limited so as to require a cell tower structure.

"User equipment" (UE), "user device," "mobile device," and "wireless communication device" are used interchangeably to refer to a device having hardware and software that is employed by a user in order to send and/or receive electronic signals/communication over the network. User devices generally include one or more antennas coupled to a radio for exchanging (e.g., transmitting and receiving) transmissions with an in-range base station, that also have an antenna or antenna array. In aspects, user devices may take on any variety of devices, such as a personal computer, a laptop computer, a tablet, a netbook, a mobile phone, a smartphone, a personal digital assistant, a wearable device, a fitness tracker, or any other device capable of communicating using one or more resources of the network. User devices may include components such as software and hardware, a processor, a memory, a display component, a power supply or power source, a speaker, a touch-input component, a keyboard, and the like. In various examples or scenarios that may be discussed herein, user devices may be capable of using 5G technologies with or without backward compatibility to prior access technologies, although the term is not limited so as to exclude legacy devices that are unable to utilize 5G technologies, for example.

The terms "radio," "controller," "antenna," and "antenna array" are used interchangeably herein to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via Full Dimensional MIMO, Massive MIMO, 3G, 4G, 5G, and/or 802.11 protocols and techniques.

"Multiplexing," "muxing," or "multiplex technique" are used interchangeably herein to refer to a telecommunications technique where a plurality of digital signals in the physical layer (Layer 1) of the seven-layer Open Systems Interconnection (OSI) model are combined into a single digital signal, such as a wireless transmission medium. Examples of multiplexing include space-division multiple access (SDMA); frequency-division multiplexing (FDM), such as frequency-division multiple access (FDMA); time-division multiplexing (TDM), such as time-division multiple access (TDMA); polarization-division multiplexing; code-division multiplexing; and orbital angular momentum multiplexing. In some aspects, such as multiple access techniques (e.g., SDMA, TDMA, FDMA), a plurality of digital signals are combined into a single digital signal by involving the physical layer as well as a medium access control (MAC) protocol in the data link layer (Layer 2). For example, the physical layer can interface with the data link layer's MAC sublayer, in such aspects. In various aspects, multiplexing can be achieved using a phased array antenna such as a Single Input Multiple Output (SIMO), Multiple Input Single Output (MISO), or MIMO array. In one example, multiple signals of downlink data can be multiplexed into a single signal using space-division multiplexing in the Physical Downlink Shared Channel (PDSCH). Multiplexed signals can be de-multiplexed at a receiving device through a reverse process.

"Physical Downlink Shared Channel" (PDSCH), as used herein, refers to a channel used in NR-based telecommunication network that encodes downlink (DL) data for receipt by a user device, i.e., data transmitted from a base station to a receiving user device.

"Demodulation Reference Signal" (DMRS or DM-RS) refers to a type of reference signal that is used to decode and estimate demodulation of physical channels such as PDSCH. Physical channels, for example, can include Physical Broadcast Channel (PBCH), Physical Downlink Control Channel (PDCCH), PDSCH, Physical Uplink Shared Channel (PUSCH), and Physical Uplink Control Channel (PUCCH). For example, DMRSs can be encoded in resource blocks or resource elements that are mapped to, assigned to, correspond to, and/or are designated for use in PDSCH transmissions. Generally, DMRS is deployed in NR-based telecommunications networks because NR-based telecommunications networks do not utilize the Cell Specific Reference Signals (CRS) reported by user devices in LTE-based telecommunications networks. In various aspects, one or more distinct DMRS types can allow for a different maximum number of ports to be used (e.g., SU-MIMO may utilize Type 1: Single-symbol: 4, dual-symbol: up to 8 orthogonal ports; MU-MIMO may utilize Type 2: Single-symbol: 6, dual-symbol: up to 12 orthogonal ports). Although examples are discussed herein with regard to downlink transmission, in some instances, DMRS can be used for uplink transmissions using PUSCH and the PUCCH.

Additionally, it will be understood that sequential or relative terms such as "first," "second," and "third" are used herein for the purposes of clarity in distinguishing between elements or features, but the terms are not used herein to import, imply, or otherwise limit the relevance, importance, quantity, technological functions, physical or temporal sequence, physical or temporal order, and/or operations of any element or feature unless specifically and explicitly stated as such.

Overview

Aspects herein provide systems, methods, and media for dynamically determining whether to utilize PDSCH multiplexing with DMRS or whether to use DMRS power boosting without PDSCH multiplexing for a user device in order to maintain or improve downlink throughput of the user device. DMRS power boosting is used to improve a user device's ability to decode the PDSCH, particularly when the user device is associated with a decreased or "low" signal value, as a low signal value can be indicative of the distance between the user device and the base station, interference from other wireless transmissions, and/or channel fade. However, PDSCH multiplexing with DMRS cannot be used with DMRS power boosting without the result of degrading, negatively impacting, and/or decreasing throughput at the user device. Decreasing or "low" throughput (e.g., reductions in the quantity of data delivered per second) of the user device is associated with negative service experiences, such as impaired and slow user experiences, errors, and poor network connectivity. Utilizing PDSCH multiplexing with DMRS power boosting is suboptimal there is a resource tradeoff. For example, when PDSCH multiplexing is used, an increased quantity of resource elements is utilized for downlink data, such that those additional resource elements being used for downlink data are unavailable for use to boost power (in decibels, dB) for the DMRS.

The systems, methods, and media herein dynamically determine whether to utilize PDSCH multiplexing with DMRS or whether to use DMRS power boosting without PDSCH multiplexing for a user device in order to maintain or improve downlink throughput of the user device. In particular, a threshold is dynamically selected that corresponds to, is associated with, or otherwise is matched to one or more metrics that are specific to a particular user device. The thresholds may be predefined and customized for the base station.

Systems and Methods

FIG. 1 provides a simplified example system 100 for implementing the methods, media, and aspects discussed herein for dynamically determining whether to utilize PDSCH multiplexing with DMRS or whether to use DMRS power boosting without PDSCH multiplexing for a user device in order to maintain or improve downlink throughput of the user device. The system 100 includes a base station 102 having one or more processors, a radio unit, and one or more antenna arrays, such as MIMO arrays. The base station 102 is communicatively coupled to a radio intelligence controller (RIC) 104, a distribution unit 106 (also interchangeably referred to as the "distributed unit"), a central unit 108 (also interchangeably referred to as the "centralized" unit), and a telecommunications core network 110, for example. Thus, one or more user devices 112 and 114 can connect to the telecommunications core network 110 through the base station 102 and its associated antenna array(s).

The RIC 104 is a software component that is communicatively coupled to one or more of the radio units of the base station 102, the distribution unit 106, or the central unit 108, or any combination thereof. The RIC 104 controls near real-time and non-real-time operations in the system 100, such as network performance, configurations, life cycle, beam optimization and more, for example. The distribution unit 106 is associated with and/or supports a physical layer associated with a plurality of physical resource blocks, in aspects. Additionally, the distribution unit 106 can be associated with and/or support a MAC layer, a Radio Link Control (RLC) layer, and others. The central unit 108 provides and/or supports one or more layers in the protocol stack, those layers being supported by or associated with the distribution unit 106. The central unit 108 can be associated with and/or support a Packet Data Convergence Protocol (PDCP) layer, a Service Data Adaptation Protocol (SDAP) layer, a Radio Resource Control (RRC) layer, and others, for example.

In aspects, the base station 102, its one or more processors, the radio unit, and the one or more antenna arrays, referred to hereinafter as "base station" for simplicity, receive a signal that encodes one or more metrics from the user device. Examples of the metrics that can be received in the signal include values for key performance indicators, rank indicator (RI), a codebook index, the identifier of a strongest beam detected by the user device, RSRP, RSRQ, SINR, RSSI, positional reference information, user device configurations, user device capabilities, the like, and any combination thereof. In one example, the one or more metrics encoded in the signal include a value representing a channel quality indicator (CQI) of the user device 112. In various examples, the CQI may be expressed as a scalar value or a data rate with 15 available codes (i.e., values 0-14). In general, a higher value represents improved or better channel link quality relative to a lower value.

The base station 102 determines an estimated signal value of the user device 112 based on the one or more metrics in the signal received. In some aspects, the estimated signal value is determined by the base station, where the estimated signal value is a CQI value that is calculated, identified, or determined by the base station 102 using at least a SINR value in the one or more metrics in the signal that was received from the user device 112. In one aspect, the base station 102 utilizes the one or more metrics, such as an RSRP value, noise level, and/or interference level, to calculate a SINR value for the user device 112, and further maps the calculated SINR to a corresponding CQI code that is stored in a database, the database defining a plurality of CQI codes, each code corresponding to different predefined ranges for SINR values. In such an example, the CQI code may serve as the estimated signal value that is determined by the base station 102. As discussed below, the estimated signal value is utilized by the base station 102 for further determinations.

The base station 102 also identifies a threshold that is specific to a base station, the one or more metrics of the user device 112, or a combination thereof, in aspects. The threshold may be identified before, subsequent to, concurrently with, or simultaneously with the determination of the estimated signal value. In various aspects, the threshold is dynamically identified to be specific to the base station (e.g., configurations, capabilities, hardware, antenna type and specifications, current data and/or historical data for that base station, such as performance metrics of the base station), to the user device 112 based on one or more metrics (e.g., configurations, capabilities, hardware, current data and/or historical data for that user device, such as performance metrics of the user device), and/or any combination thereof. The threshold is identified based at least in part on the CQI of the user device 112, such that the threshold is dynamically identified, determined, and/or selected in real-time or near real-time by the base station based on the CQI in the recently received signal from the user device 112.

This dynamic threshold identification can be performed on a regular reoccurring basis (e.g., once every 500 milliseconds, once per minute, once every 15 minutes, etc.), for each instance of a CQI signal that is received from the user device 112, and/or on a periodic basis that is based on one or more metrics of the user device 112. For example, where the user device 112 is determined to be stationary based on one or more user device metrics, the base station may re-evaluate and dynamically identify or determine a threshold again (whether the same or different) once every 15 minutes. In another example, where the user device 112 is determined to be traveling with a mobility or physical speed that meets or exceeds a predetermined value based on one or more user device metrics, the base station 102 may repeat the dynamic threshold identification discussed herein on a shorter periodic duration, as signal quality of the user device 112 may quickly decrease as the user device approaches the edge of the cell site of the base station. Alternatively, the base station 102 may repeat the dynamic threshold identification discussed herein after a longer periodic duration, as signal quality of the user device 112 may significantly improve as the user device 112 approaches the interior locations of the cell site of the base station 102.

Additionally or alternatively, the dynamic threshold identification can be performed using metrics of the base station 102, historical traffic and usage patterns of the base station 102, current loading of the base station, a total quantity of user devices that are currently served by the base station 102, and hardware capabilities and/or component configurations of the base station 102, whether alone or in view of one or more metrics of the user device 112. For example, the base station 102 may determine that the user device 112 is determined to be stationary based on one or more user device metrics, and may further determine that the base station 102 is historically experiencing high traffic at this day of the week at the present time. In this example, the base station 102 may re-evaluate and dynamically identify or determine a threshold again (whether the same or different), as the signal quality of the user device 112 may change based on a predicted increase in traffic or loading at the base station 102.

In various aspects, identifying the particular threshold can include identifying a plurality of thresholds that are predefined as specific to the base station 102. In such an aspect, a particular threshold (within the plurality) may be identified and/or determined to be associated with at least one of the one or more metrics of the user device 112, for example, by the base station 102. The base station 102 can determine to utilize the particular threshold to evaluate the estimated signal value of the user device 112, for example, based on the association identified or determined by the base station 102. In one example, the one or more metrics include travel speed of the user device 112 (e.g., user device is traveling at 55 miles per hour [in a vehicle]). In that example, the base station 102 identifies a value of the travel speed of the user device 112 and further identifies a particular threshold that is associated with the metric of travel speed. In another example, the one or more metrics include a channel quality indicator (CQI) of the user device 112. In such an example, the base station 102 identifies a value quantifying channel quality in the channel quality indicator that is specific to the user device 112 and further identifies a particular threshold that is associated with the metric of channel quality. In some aspects, when the one or more metrics of the user device 112 include a CQI, for example, the base station 102 may map the value representing the CQI of the user device 112 to a particular threshold within a plurality of thresholds that are predefined as specific to the base station 102. That particular threshold can be identified by the base station 102 for utilization in determining whether or not to employ multiplexing when communicating with that specific user device 112. These examples are merely illustrative such that other metrics of the user device 112, whether alone or in combination, are contemplated in the dynamic selection of the threshold. In further aspects, determining that the particular threshold is associated with at least one of the one or more metrics of the user device 112 incudes the base station 102 identifying each of the one or more metrics and identifying a threshold that corresponds to each of the one or more metrics. As such, multiple thresholds for multiple metrics might be leveraged.

In some aspects, the dynamic identification of the threshold can be output from a machine learning algorithm that has been trained with data sets of historical performance data of the present base station, of one or more neighboring base stations, of one or more base stations with the same or similar hardware and software, of one or more base stations with the same or similar antenna arrays, of one or more base stations having the same or similar historical usage and traffic patterns, or any combination thereof. Additionally or alternatively, the training data sets can include user device-reported data, such as one or more metrics encoded in CQI signals reported from various user devices to the one or more base stations discussed above. The training set may include associations between data, such as associations between one or more metrics encoded in CQI signals reported from various user devices to the one or more base stations discussed above, as well as one or more previously assigned thresholds utilized by the one or more base stations discussed above.

The base station 102 compares the estimated signal value of the user device 112 to the threshold identified. The base station 102 can determine whether the estimated signal value meets the threshold, is below the threshold, is above the threshold, is increasing to approach the threshold, and/or is decreasing to approach becoming below the threshold.

When the estimated signal value is at or above the threshold, the base station 102 determines that it will communicate with the user device 112 by using multiplexing without power boosting. In such instances, the base station 102 uses multiplexing without power boosting to communicate with the user device 112. As such, communicating with the user device 112 using multiplexing without power boosting includes, for example, multiplexing one or more symbols in a physical downlink shared channel (PDSCH) with a demodulation reference signal (DMRS) when scheduling communications and/or otherwise communicating with the user device 112. In one example, the base station 102 has mapped a first metric of the one or more metrics to a particular threshold within a plurality of thresholds that are predefined as specific to the base station 102, wherein the particular threshold includes a predefined value for evaluating the first metric. Then, when a value of the first metric is within or above the predefined value of the particular threshold, the base station 102 communicates with the user device 112 by using power boosting with multiplexing. Because the first metric is at or above the threshold, the base station 102 determines that the signal of the user device 112 is appropriate for communicating without power boosting, as power boosting is used to improve service quality when a signal is degraded and/or is being negatively impacted.

When the estimated signal value is below the threshold, the base station 102 determines that it will communicate with the user device 112 by using power boosting without multiplexing. In such instances, the base station 102 uses power boosting to communicate with the user device 112 and does not use multiplexing. As such, communicating with the user device 112 using power boosting without multiplexing includes, for example, using power boosting to send DMRS in the PDSCH when scheduling communications and/or otherwise communicating with the user device 112. In such a scenario, one or more symbols remain unscheduled (i.e., no data) to support the power boosting of the DMRS.

In one example, the base station 102 has mapped a first metric of the one or more metrics to a particular threshold within a plurality of thresholds that are predefined as specific to the base station 102, wherein the particular threshold includes a predefined value for evaluating the first metric. Then, when a value of the first metric is below the predefined value of the particular threshold, the base station 102 communicates with the user device 112 by using power boosting without multiplexing. Because the first metric is below the threshold, the base station 102 determines that the signal of the user device 112 is such that scheduling and communicating with power boosting is beneficial, as power boosting is predicted to improve the service quality in light of the user device's signal being degraded and/or being negatively impacted (i.e., below the threshold).

Figure 2:
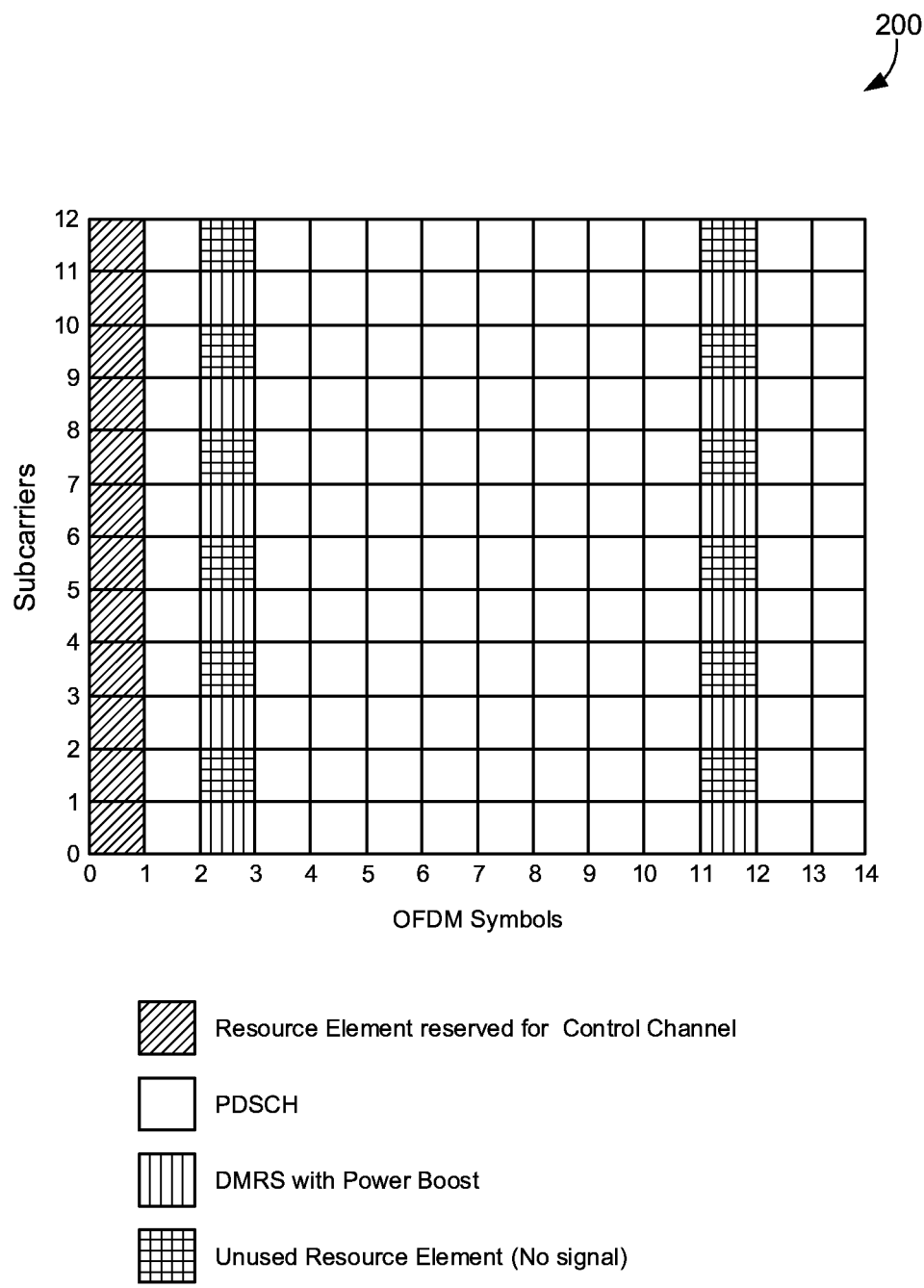
FIG. 2 illustrates a grid representing the allocation of symbols and subcarriers using multiplexing in an example of an Orthogonal Frequency Division Multiplexing (OFDM) environment without the use of power boosting, in accordance with one or more aspects.
Figure 3:
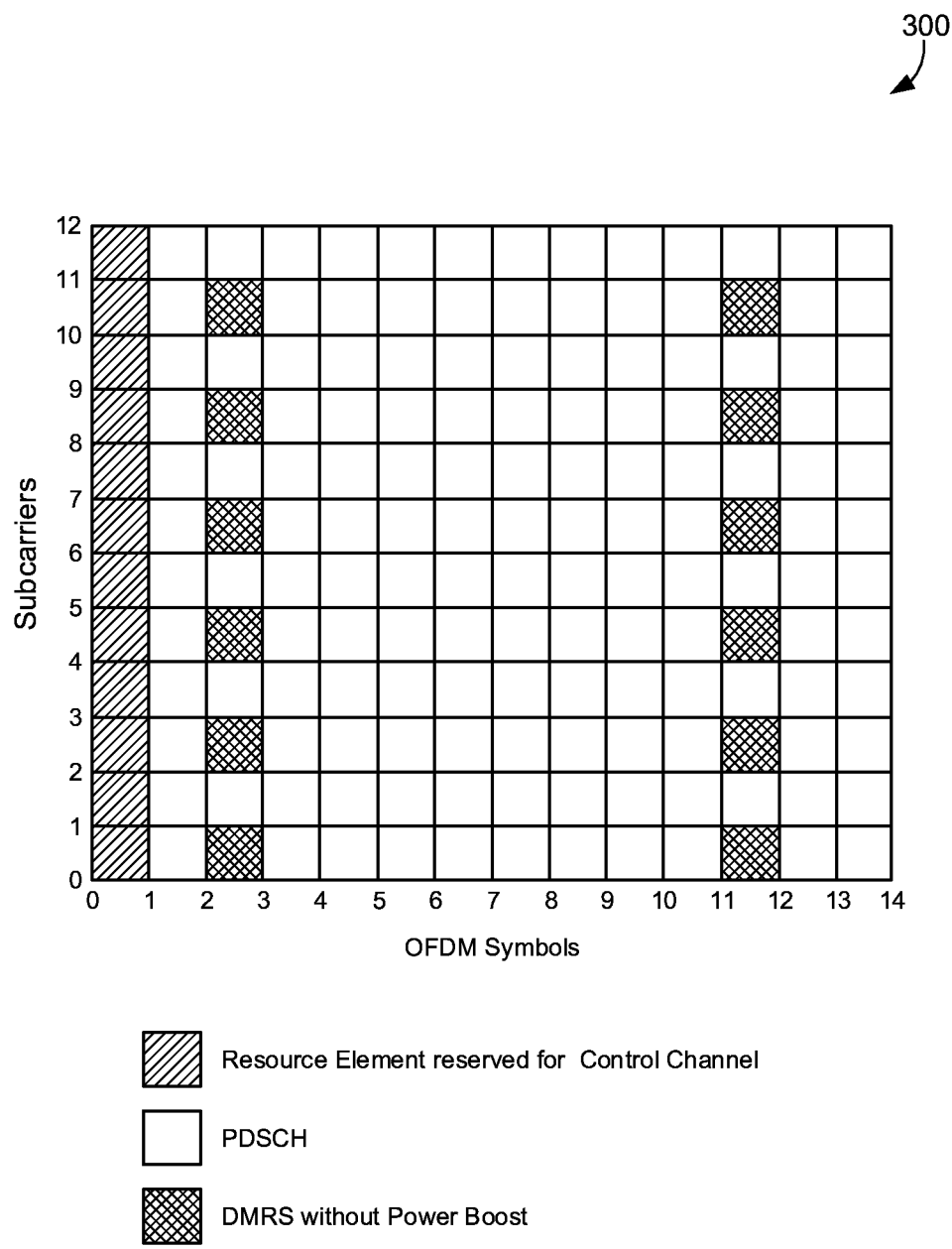
FIG. 3 illustrates a grid representing the allocation of symbols and subcarriers without using multiplexing in an example of an OFDM environment with the use of power boosting, in accordance with one or more aspects.

FIG. 2 illustrates a grid 200 representing the allocation of symbols 202 on an x-axis 204 and subcarriers 206 on a y-axis 208 for PDSCH using multiplexing in an Orthogonal Frequency Division Multiplexing (OFDM) environment without the use of power boosting for DMRS. In contrast, FIG. 3 illustrates a grid 300 representing the allocation of symbols 302 on an x-axis 304 and subcarriers 306 on a y-axis 308 for PDSCH without using multiplexing in an OFDM system with the use of power boosting for DMRS. The terms "symbol" and "resource element" are used interchangeably herein for simplification of this discussion. As illustrated in FIG. 2, one or more symbols remain unscheduled (i.e., no data is scheduled for symbols 210A, 212B, 214A, or 216B) to support the power boosting of DMRS. In contrast, FIG. 3 shows that in the absence of power boosting, those symbols (e.g., symbols 210A, 212B, 214A, and 216B) are scheduled with data. In FIGS. 2 and 3, various symbols are reserved, allocated, and/or scheduled with data that specifically corresponds to PDSCH data, that specifically corresponds to DMRS data, or that corresponds to other NR control channel data, according to the shading and key shown. It will be understood from this Description that the visual depiction using representative grids is merely one example, and that the particular allocation of subcarriers and symbols may be configured or reconfigured for particular ports (e.g., ports 1000, 1001, 1002, and 1003), the quantity of PDSCH layers, specific PDSCH mapping types (e.g., A, B, etc.), DMRS configuration types, DMRS position types (e.g., A, B, etc.), DMRS length (e.g., one resource element, two consecutive resource elements, etc.), and/or any combination thereof, for example.

Having discussed the system 100 in detail, it will be understood that in various aspects, the system 100 utilizes one or more processors and the components discussed above to perform specific operations and functions as further discussed hereinafter. Having described the system 100 and components thereof, it will be understood by those of ordinary skill in the art that system 100 is but one example of a suitable system and is not intended to limit the scope of use or functionality of the present invention. Similarly, the system 100 should not be interpreted as imputing any dependency and/or any requirements with regard to each component and combination(s) of components illustrated in FIG. 1. It will be appreciated by those of ordinary skill in the art that the location of components illustrated in FIG. 1 is an example (as other methods) of hardware, software, components, and devices for establishing communication links between the components shown in the system 100 of FIG. 1 that may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components are represented in FIG. 1 as singular components, it will be appreciated that some aspects may include a plurality of devices and/or components such that FIG. 1 should not be considered as limiting the number of a device or component. It will be understood by those of ordinary skill in the art that system 100 is but one example of a suitable system and is not intended to limit the scope of use or functionality of the present invention. Similarly, system 100 should not be interpreted as imputing any dependency and/or any requirements with regard to each component and combination(s) of components illustrated in FIG. 1. It will be understood to those of ordinary skill in the art that the components may be connected in various manners, hardwired or wireless, and may use intermediary components that have been omitted or not included in FIG. 1 for simplicity's sake.

Figure 4:
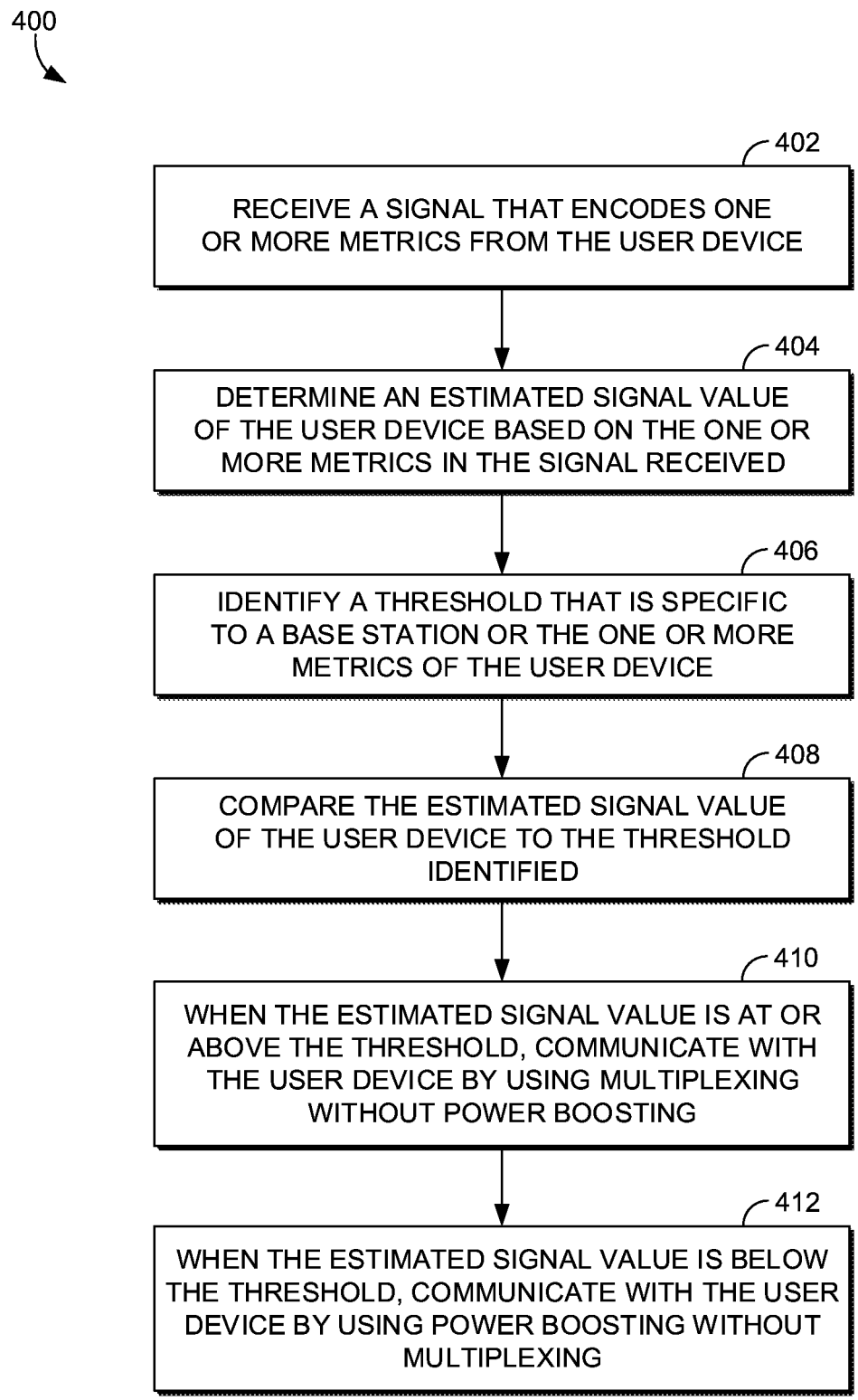
FIG. 4 depicts an example method, in accordance with one or more aspects.

Turning to FIG. 4, a method 400 is provided for dynamically determining when to use multiplexing in a wireless network with or without power boosting when scheduling communications for a user device. In some aspects, the method 400 can be a computer-implemented method. In one aspect, one or more non-transitory computer-readable storage media having computer-readable instructions or computer-readable program code portions embodied thereon, for execution via one or more processors, can be used to implement and/or perform the method 400. For example, computer-readable instructions or computer-readable program code portions can specify the performance of the method 400, can specify a sequence of steps of the method 400, and/or can identify particular component(s) of software and/or hardware for performing one or more of the steps of the method 400, in aspects. As discussed below, the method 400 can be performed using the software, hardware, component(s), and/or device(s) depicted in the system 100 of FIG. 1.

At block 402, a signal that encodes one or more metrics is received from the user device. The signal may be received by the base station and/or one of the components associated with the base station, in various aspects. At block 404, an estimated signal value of the user device is determined based on the one or more metrics in the signal received. The estimated signal value may be determined by the base station, one of the components associated with the base station, or other network component, in various aspects. In some aspects, the estimated signal value may be indirectly obtained based on at least one of the one or more metrics, or the estimated signal value may correspond directly to one of the one or more metrics. At block 406, a threshold that is specific to a base station or the one or more metrics of the user device is identified. This may be performed by the base station, one of the components associated with the base bastion, or other network component, in various aspects. At block 408, the estimated signal value of the user device is compared to the threshold identified. The estimated signal value may be determined by the base station, one of the components associated with the base bastion, or other network component, in various aspects. At block 410, when the estimated signal value is at or above the threshold, communications to the user device are transmitted using multiplexing without power boosting. In some aspects, a base station schedules (e.g., OFDM symbols) and communicates with the user device by specifically allocating symbols for communicating the PDSCH and MRS, for example, using the same or similar allocations of resource elements shown in FIG. 3, such that the symbols are scheduled using multiplexing. At block 412, when the estimated signal value is below the threshold, communications to the user device are transmitted using power boosting without multiplexing. In some aspects, a base station schedules (e.g., OFDM symbols) and communicates with the user device by specifically allocating symbols for communicating the PDSCH and DMRS, for example, using the same or similar allocations of resource elements shown in FIG. 2, such that some symbols are unscheduled and/or are not scheduled with any data to accommodate power boosting.

Figure 5:
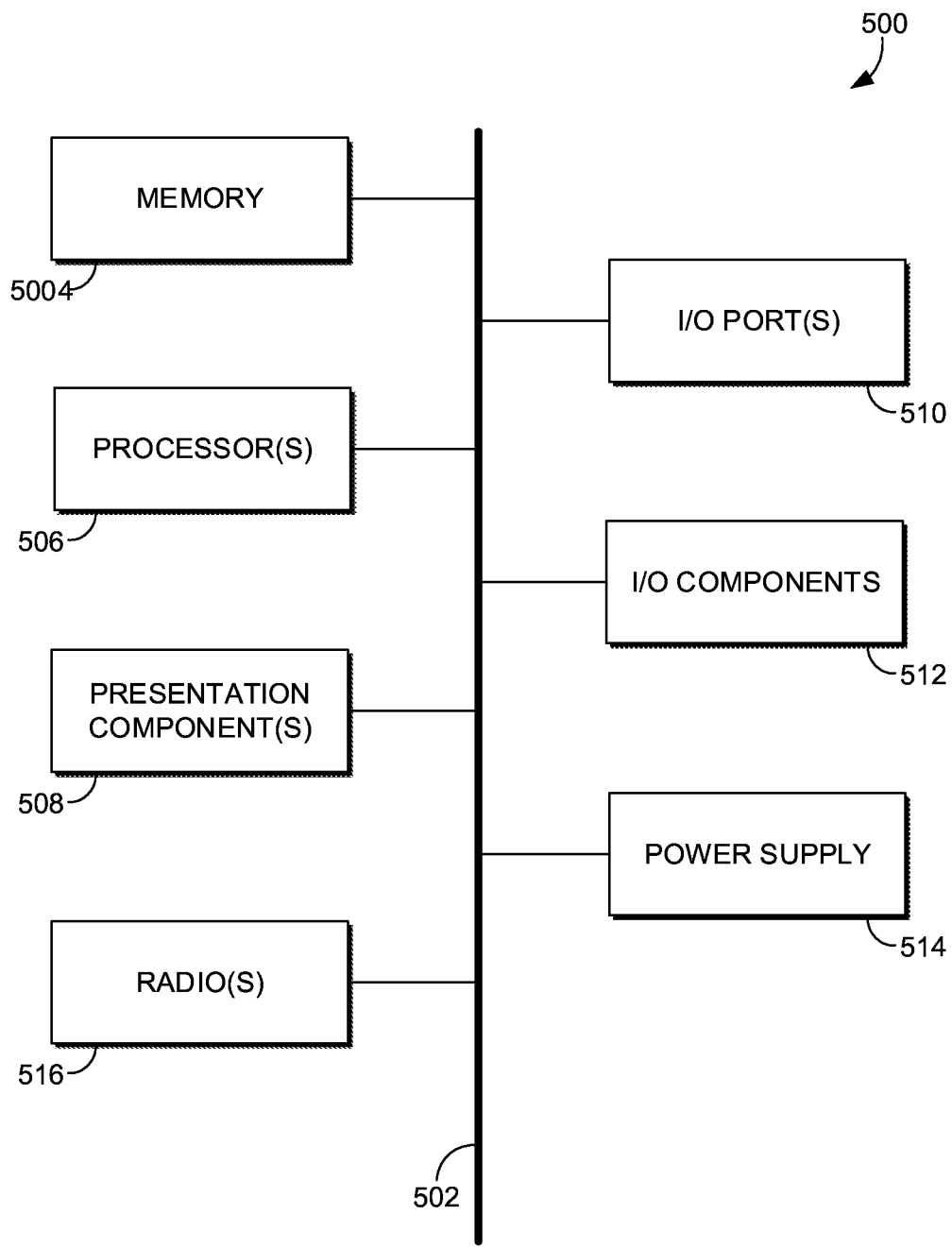
FIG. 5 illustrates an example computing device suitable for use in implementations of the present disclosure.

Turning now to FIG. 5, a diagram is depicted of an example computing device suitable for use in implementations of the present disclosure. Computing device 500 is but one example of a suitable computing environment and is not intended to suggest any limitation as to the scope of use or functionality of the invention, and nor should computing device 500 be interpreted as having any dependency or requirement relating to any one or combination of components illustrated.

The implementations of the present disclosure may be described in the general context of computer code or machine-useable instructions (including computer-executable instructions such as program components) being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 510, I/O components 512, and power supply 514. Bus 502 represents what may be one or more buses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory.

The computing device 500 may correspond to a base station, such as a gNode B, or other software and hardware components for controlling or directing a base station. The computing device 500 typically includes a variety of computer-readable media. Computer-readable media can be any available media that can be accessed by the computing device 500 and includes both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile disks (DVD) or other optical disk storage, magnetic cassettes, magnetic tape, and magnetic disk storage or other magnetic storage devices. Computer storage media does not comprise a propagated data signal. Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer storage media in the form of volatile and/or non-volatile memory. Memory 504 may be removable, non-removable, or a combination thereof. Examples of memory includes solid-state memory, hard drives, optical-disc drives, etc. The computing device 500 includes one or more processors 506 that read data from various entities such as bus 502, memory 504, or I/O components 512. One or more presentation components 508 presents data indications to a person or other device. Examples of one or more presentation components 508 include a display device, speaker, printing component, vibrating component, etc. I/O ports 510 allow the computing device 500 to be logically coupled to other devices including I/O components 512, some of which may be built into the computing device 500. Illustrative I/O components 512 include a microphone, joystick, game pad, satellite dish, scanner, printer, wireless device, etc.

The radio 516 represents a radio that facilitates communication with a wireless telecommunications network, as previously discussed. The radio 516 might additionally or alternatively facilitate other types of wireless communications including Wi-Fi, WiMAX, LTE, or other VoIP communications. As can be appreciated, in various aspects radio 516 can be configured to support multiple technologies and/or multiple radios can be utilized to support multiple technologies. A wireless telecommunications network might include an array of devices, which are not shown so as to not obscure more relevant aspects of the invention. The radio 516 may include, for example, converters, power amplifiers, power supplies, band-pass filters, and other components. In some aspects, the radio 516 includes Synchronization and Fronthaul Transport components, Lower Physical Layer Baseband Processing components, Digital Front End (DFE) components, and/or RF Front End (RF FE) components, for example, to operate and function with an open RAN. In some aspects, the radio 516 is coupled to and/or manages communications of a base station and an antenna and/or antenna array(s), such as 5G NR communications transmitted and received via a MIMO array.

Many different arrangements of the various components depicted, as well as components not shown, are possible without departing from the scope of the claims below. Aspects of our technology have been described with the intent to be illustrative rather than restrictive. Alternative aspects will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A computerized method comprising:
   receiving a signal that encodes one or more metrics from the user device;
   determining an estimated signal value of the user device based on the one or more metrics in the signal received;
   identifying a threshold that is specific to a base station or the one or more metrics of the user device;
   comparing the estimated signal value of the user device to the threshold identified;
   when the estimated signal value is at or above the threshold, communicating with the user device by using multiplexing without power boosting; and
   when the estimated signal value is below the threshold, communicating with the user device by using power boosting without multiplexing.

2. The method of claim 1, wherein communicating with the user device by using multiplexing without power boosting comprises multiplexing one or more symbols in a physical downlink shared channel (PDSCH) with a demodulation reference signal (DMRS) when communicating with the user device.

3. The method of claim 1, wherein communicating with the user device by using power boosting without multiplexing comprises communicating a PDSCH with a DMRS with power boosting, wherein one or more symbols remain unscheduled to support the power boosting of the DMRS.

4. The method of claim 1, wherein the one or more metrics include travel speed of the user device, and wherein identifying the threshold that corresponds to the one or more metrics comprises:
   identifying a value of the travel speed of the user device; and
   identifying a particular threshold that is associated with the metric of travel speed.

5. The method of claim 1, wherein the one or more metrics include a channel quality indicator (CQI) of the user device, wherein identifying the threshold comprises:
   identifying a value quantifying channel quality in the channel quality indicator that is specific to the user device; and
   identifying a particular threshold that is associated with the metric channel quality.

6. The method of claim 1, wherein the one or more metrics include a signal quality indicator of the user device, wherein identifying the threshold comprises:
   identifying a value quantifying the signal quality indicator that is specific to the user device; and
   identifying a particular threshold that is associated with the metric of the signal quality indicator.

7. The method of claim 1, wherein identifying the threshold comprises:
   identifying a plurality of thresholds that is predefined as specific to the base station;
   determining that a particular threshold is associated with at least one of the one or more metrics of the user device; and
   determining to utilize the particular threshold to evaluate the estimated signal value of the user device.

8. The method of claim 7, wherein determining that the particular threshold is associated with at least one of the one or more metrics of the user device comprises identifying each of the one or more metrics and identifying a threshold that corresponds to each of the one or more metrics.

9. One or more non-transitory computer-readable media storing instructions that when executed via one or more processors performs a computerized method, the media comprising:
via one or more processors, and for each of a plurality of user devices associated with a base station:
receiving a signal that encodes one or more metrics from the user device;
determining an estimated signal value of the user device based on the one or more metrics in the signal received;
identifying a threshold that is specific to a base station or the one or more metrics of the user device;
comparing the estimated signal value of the user device to the threshold identified;
when the estimated signal value is at or above the threshold, communicating with the user device by using multiplexing without power boosting; and
when the estimated signal value is below the threshold, communicating with the user device by using power boosting without multiplexing.

10. The media of claim 9, wherein the one or more metrics encoded in the signal include a value representing a channel quality indicator (CQI) of the user device.

11. The media of claim 10, further comprising mapping the value representing the CQI of the user device to a particular threshold within a plurality of thresholds that are predefined as specific to the base station.

12. The media of claim 11, further comprising determining to utilize the particular threshold to evaluate the estimated signal value of the user device.

13. The media of claim 8, further comprising mapping a first metric of the one or more metrics to a particular threshold within a plurality of thresholds that are predefined as specific to the base station, wherein the particular threshold includes a predefined value for evaluating the first metric, wherein when a value of the first metric is within or above the predefined value of the particular threshold, the base station communicates with the user device by using power boosting with multiplexing.

14. The media of claim 8, further comprising mapping a first metric of the one or more metrics to a particular threshold within a plurality of thresholds that are predefined as specific to the base station, wherein the particular threshold includes a predefined value for evaluating the first metric, wherein when a value of the first metric is below the predefined value of the particular threshold, the base station communicates with the user device by using power boosting without multiplexing.

15. A system comprising:
one or more processors communicatively coupled to a base station, the one or more processors configured to:
receive a signal that encodes one or more metrics from the user device;
determine an estimated signal value of the user device based on the one or more metrics in the signal received;
identify a threshold that is specific to a base station or the one or more metrics of the user device;
compare the estimated signal value of the user device to the threshold identified;
when the estimated signal value is at or above the threshold, cause the base station to communicate with the user device using multiplexing without power boosting; and
when the estimated signal value is below the threshold, cause the base station to communicate with the user device using power boosting without using multiplexing.

16. The system of claim 15, wherein the one or more metrics encoded in the signal include a value representing a channel quality indicator (CQI) of the user device.

17. The system of claim 16, wherein the one or more processors are configured to map the value representing the CQI of the user device to a particular threshold within a plurality of thresholds that are predefined as specific to the base station.

18. The system of claim 17, wherein the one or more processors are configured to determine to utilize the particular threshold to evaluate the estimated signal value of the user device.

19. The system of claim 15, wherein the one or more processors are configured to map a first metric of the one or more metrics to a particular threshold within a plurality of thresholds that are predefined as specific to the base station, wherein the particular threshold includes a predefined value for evaluating the first metric, wherein when a value of the first metric is within or above the predefined value of the particular threshold, the base station communicates with the user device by using power boosting with multiplexing.

20. The system of claim 15, wherein the one or more processors are configured to map a first metric of the one or more metrics to a particular threshold within a plurality of thresholds that are predefined as specific to the base station, wherein the particular threshold includes a predefined value for evaluating the first metric, wherein when a value of the first metric is below the predefined value of the particular threshold, the base station communicates with the user device by using power boosting without multiplexing.

* * * * *